Oct. 9, 1945.　　　A. C. MASON　　　2,386,623
MACHINE FOR FORMING SEPARATED BODIES
Filed March 18, 1943　　　2 Sheets-Sheet 1

INVENTOR,
Arthur C. Mason,
BY
ATTORNEY.

Oct. 9, 1945.    A. C. MASON    2,386,623
MACHINE FOR FORMING SEPARATED BODIES
Filed March 18, 1943    2 Sheets-Sheet 2

INVENTOR,
Arthur C. Mason,
BY
ATTORNEY.

Patented Oct. 9, 1945

2,386,623

UNITED STATES PATENT OFFICE 2,386,623

MACHINE FOR FORMING SEPARATED BODIES

Arthur C. Mason, Paterson, N. J.

Application March 18, 1943, Serial No. 479,612

7 Claims. (Cl. 51—103)

In a known type of grinding machine there are a rotary grinding element, means, usually rotary, to hold the work pressed against the grinding periphery of said element, and means, as an anvil, to support the work against the rotary tractive effort, and with its axis substantially parallel with the axis, of said element.

The present invention contemplates the combination, with such a machine, of means for rotating the work, as a stick, around its own axis during the grinding, that is to say, positively, as where the work-holding element, though having a tractive periphery, fails to effect such rotation as an incident of the latter's cross-sectional form and the effect of the anvil, due to such form, to oppose the rotation.

Rotation of the work by the indicated positively acting means might be depended on entirely independently of any rotation-imparting effort of the work-holding element except for the following which has to do with my ultimate object, to wit: In the case, for instance, where the grinding forms a groove or grooves ultimately of such depth that before the grinding can be completed the work may be ruptured at a groove under torsional strain incident to dependence on said means, it is necessary that before the work becomes by the grinding responsive to rupture the work-holding element, which coacts with the grinding element to clamp the work both sides of any such groove (thus to prevent the torsional strain) should act to rotate the work. Hence my invention contemplates that said work-holding element shall be rotated at a speed superior to that imparted to the work by the indicated means for positively rotating the work and that such means shall include an overrunning clutch for transmitting rotation to the work independently of the work-holding element. Thereby, when said means has rotated the work until it is substantially circular in cross-section wherever it abuts the anvil and the latter will therefore be no longer substantially effective to hold the work against rotation, the work-holding element may carry on the function of rotating the work.

Figure 2:
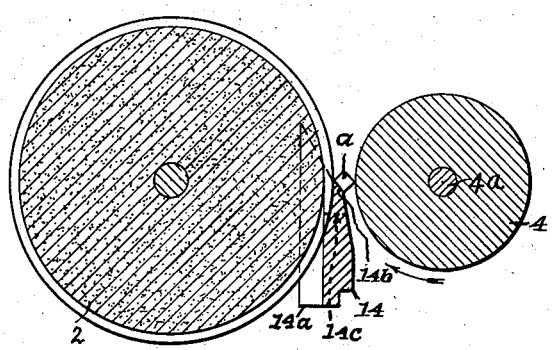
Fig. 2 is a sectional view through the two rotary elements, the anvil and the work.
Figure 3:
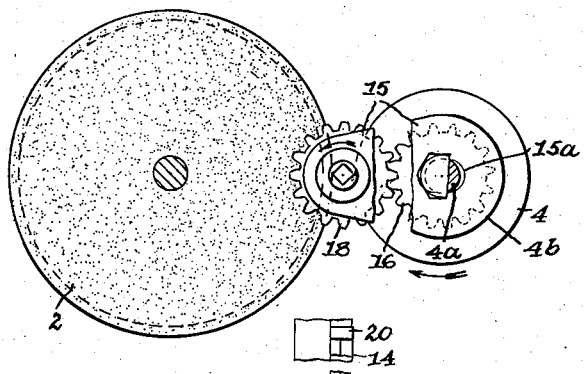
Fig. 3 is a side elevation, partly broken away, of parts involved in the positive rotation of the work, together with said elements.
Figure 4:
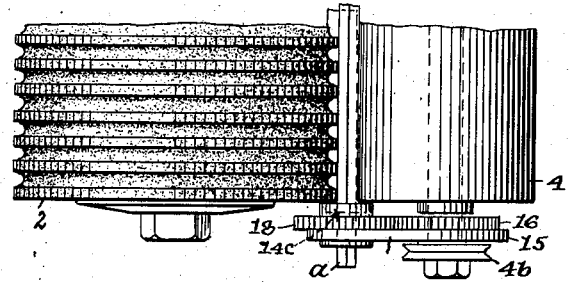
Fig. 4 is a fragmentary plan of what is shown in Fig. 3.
Figure 6:
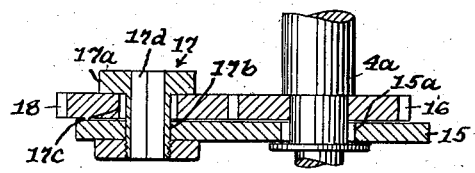
Fig. 6 is a sectional view of said parts on line 6—6, Fig. 5.

In supporting structure 1 of a known grinding machine to which my invention is applicable is journaled the grinding element 2 having its grinding periphery fluted, since in this example the work, as a stick $a$, is to be developed into a number of detached pieces each having a given form, depending on the contour of the flutes. Having its shaft $4a$ journaled in a yoke 3 of said structure, pivoted in a fixed part of the latter at $3a$, is the work-holding element 4, its work-contacting periphery, usually roughened, being presented to the periphery of the grinding element; the axes of said elements and at $3a$ are here parallel. Any means for moving the yoke and hence element 4 toward the grinding element, as periodically, being not here material, may be provided. In the present instance the grinding and work-holding elements are parts of a common rotary train or means. That is, elements 2 and 4 have pulleys $2a$ and $4b$, respectively, and element 2 is connected by a belt 7, engaging its pulley, with a pulley 8; element 4 is connected by a belt 9, engaging its pulley, with a pulley 10; and pulleys 11 and 12, respectively units with the pulleys 8 and 10, are connected by a belt 13, the drive being, as usual, such that element 2 is driven at a greater speed than element 4. The anvil or means to oppose displacement of the work $a$ in response to tractive effort of the grinding element here consists of a flat rod 14 having a thickened portion $14a$ relatively beyond the grinding element as shown in Fig. 2 and which portion may in any way be rigidly secured to the fixed portion and so in effect be a part of the supporting structure, said anvil projecting toward the observer between the elements and having a top work-supporting surface $14b$ pitched upwardly toward the grinding element and cut by a plane coincident with the axes of said elements.

Figure 1:
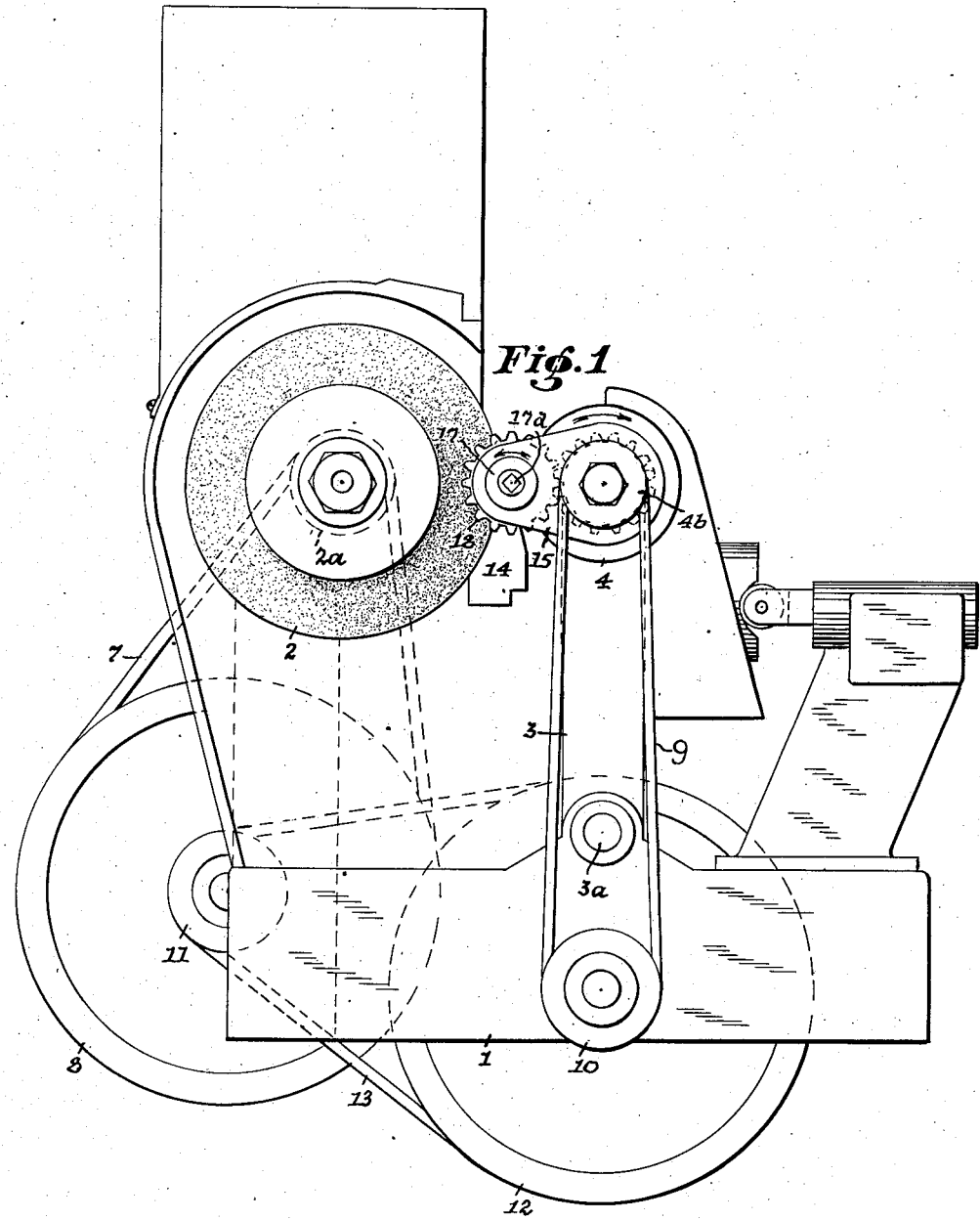
Fig. 1 is a side elevation of mechanism embodying my invention.
Figure 5:
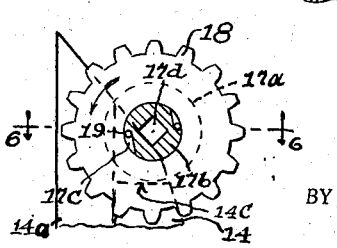
Fig. 5 shows the chuck in vertical section through its arbor, and also the anvil.

I provide the machine with a carrier 15 which is penetrated and thus supported, in part by the shaft $4a$, its aperture for the shaft being a slot $15a$. On said shaft I fix a gear or pinion 16. In the carrier in alinement with the slot and on an axis parallel with said shaft is journaled a chuck 17 whose head $17a$ may rest on the end of the anvil the nearer to the observer in Fig. 1, such end being at the near side of the grinding periphery of the grinding element and having a preferably horizontal top surface or guideway 14c (Fig. 5) actually contacted by said head; thus by the shaft and the anvil the assembly including the carrier and chuck is supported, being free to shift back and forth in the directions in which the work-holding element is generally movable. Journaled on the chuck is a pinion or gear 18 in mesh with pinion 16 and forming with the chuck an overrunning clutch; that is, the arbor portion 17b of the chuck has notches 17c which contain rollers 19 and which are of such well-known form that, when the pinion 18 rotates in the direction of the arrow in Fig. 5 while rotation of the chuck is resisted, the pinion drives the chuck, but the chuck is free to be rotated in said direction at a speed exceeding that of the pinion. The work a, as the mentioned stick, is assumed to have initially some other than perfectly circular cross-sectional form, as here rectangular. To cause the chuck to perform its known function, that is, to grip the work so as to rotate the same, the chuck has a bore 17d which, because the work is rectangular in cross-section, is similarly rectangular, being of such dimensions that when it receives the work neither of the parts can undergo complete independent revolution.

Beyond the grinding periphery of element 2 relatively to and opposite the chuck is a work-stop 20 on some part of the supporting structure, as the anvil.

Assume the work, as a stick a, is positioned on the anvil and penetrates the chuck, element 4 being retracted and both elements being driven in the directions shown by the arrows. Element 4 is moved toward element 2 to hold the work against the latter so that grinding by the latter proceeds. The work is to be circumferentially ground and for this purpose a function of element 4 is to rotate the work by tractive engagement therewith. But a face of the work abuts the anvil and so the work cannot be started rotating by element 4. However, the chuck is undergoing rotation due to its being intergeared with said element wherefore, notwithstanding the resistance by the anvil to rotation of the work, the latter is positively made to rotate. As the grinding now proceeds, circumferentially of the work, with displacement thereof by element 4 toward element 2, due to slot 15a the assembly comprising the chuck and its carrier is displaced with the work. The drive of the work in this manner proceeds until element 2 has reduced the work to at least that (approximately circular) cross-sectional form in which the anvil will cease to be an obstacle to its rotation, whereupon such rotation will be continued by element 4, assuming that (as here) at least its peripheral speed is greater than the speed imparted to the work by the chuck—the clutch permitting the chuck to be driven at a now increased speed, to wit, by the work.

The work may be ground into one or more detached portions, thus disposing of a part of the length of the stick on each grinding operation. At the beginning of any such operation the attendant thrusts the stick through the chuck until it abuts the work-stop.

According to my invention, regardless of what expedient drives the chuck or whether or not it is confined to a plane perpendicular to the axis of the work (as by the machine including the carrier 15), the machine includes means (here surface 14c of a fixed part of the machine) to guide the chuck in a path coincident with that of the work in response to the pressure of the means, as 4, to press the work against the grinding element.

Having thus fully described my invention, what I claim is:

1. The combination, with a grinding machine including supporting structure, a rotary grinding element having a grinding periphery, means, movable toward said periphery, to press the work thereagainst, and means to support the work against the rotary tractive effort, and with its own axis substantially parallel with the axis, of said element, of a rotary work-rotating chuck free to move with and movable by the work as the latter moves in response to the pressure of the first-named means, said machine also including means to guide the chuck in a path coincident with that of the work during movement of the latter in response to the pressure of said first-named means.

2. The machine set forth in claim 1 characterized by the last-named means being a fixed guideway for the chuck extending parallel with the path of movement of the work during movement of the latter in response to the pressure of said first-named means.

3. The machine set forth in claim 1 characterized by said machine also including means to confine the chuck to a plane perpendicular to its axis of rotation.

4. The machine set forth in claim 1 characterized by said machine also including means to rotate the chuck.

5. The combination, with a grinding machine including supporting structure, a rotary grinding element having a grinding periphery, a rotary work-holding element having its axis substantially parallel with the axis of the grinding element, the peripheries of the two elements being opposed to each other and one of said elements being movable toward the other, and means to support the work against the rotary tractive effort, and with its own axis substantially parallel with the axis, of the grinding element, of a rotary work-rotating chuck, and means to rotate said work-holding element and the chuck, the former at a peripheral speed superior to that at which the chuck rotates the work, the last-named means including an overrunning clutch for transmitting rotation to the chuck independently of said work-holding element.

6. The combination, with a grinding machine including supporting structure, a rotary grinding element having a grinding periphery, a rotary work-holding element having its axis substantially parallel with the axis of the grinding element, the peripheries of said elements being opposed to each other and the work-holding element being movable toward the grinding element, and means to support the work against the rotary tractive effort, and with its own axis substantially parallel with the axis, of the grinding element, of a rotary work-rotating chuck free to move with the work as the latter moves in response to pressure of the work-holding element, and means to rotate said work-holding element and the chuck, the former at a peripheral speed superior to that at which the chuck rotates the work, the last-named means including an overrunning clutch for transmitting rotation to the chuck independently of said work-holding element.

7. The combination, with a grinding machine including supporting structure, a rotary grinding element having a grinding periphery, means, movable toward said periphery, to press the work thereagainst, and means to support the work against the rotary tractive effort, and with its own axis substantially parallel with the axis, of said element, of a rotary work-rotating chuck free to move with and movable by the work as the latter moves in response to the pressure of the first-named means, said machine also including means to guide the chuck in a path coincident with that of the work during movement of the latter in response to the pressure of said first-named means and means, including an overrunning clutch, to rotate the chuck.

ARTHUR C. MASON.